Figure 1:
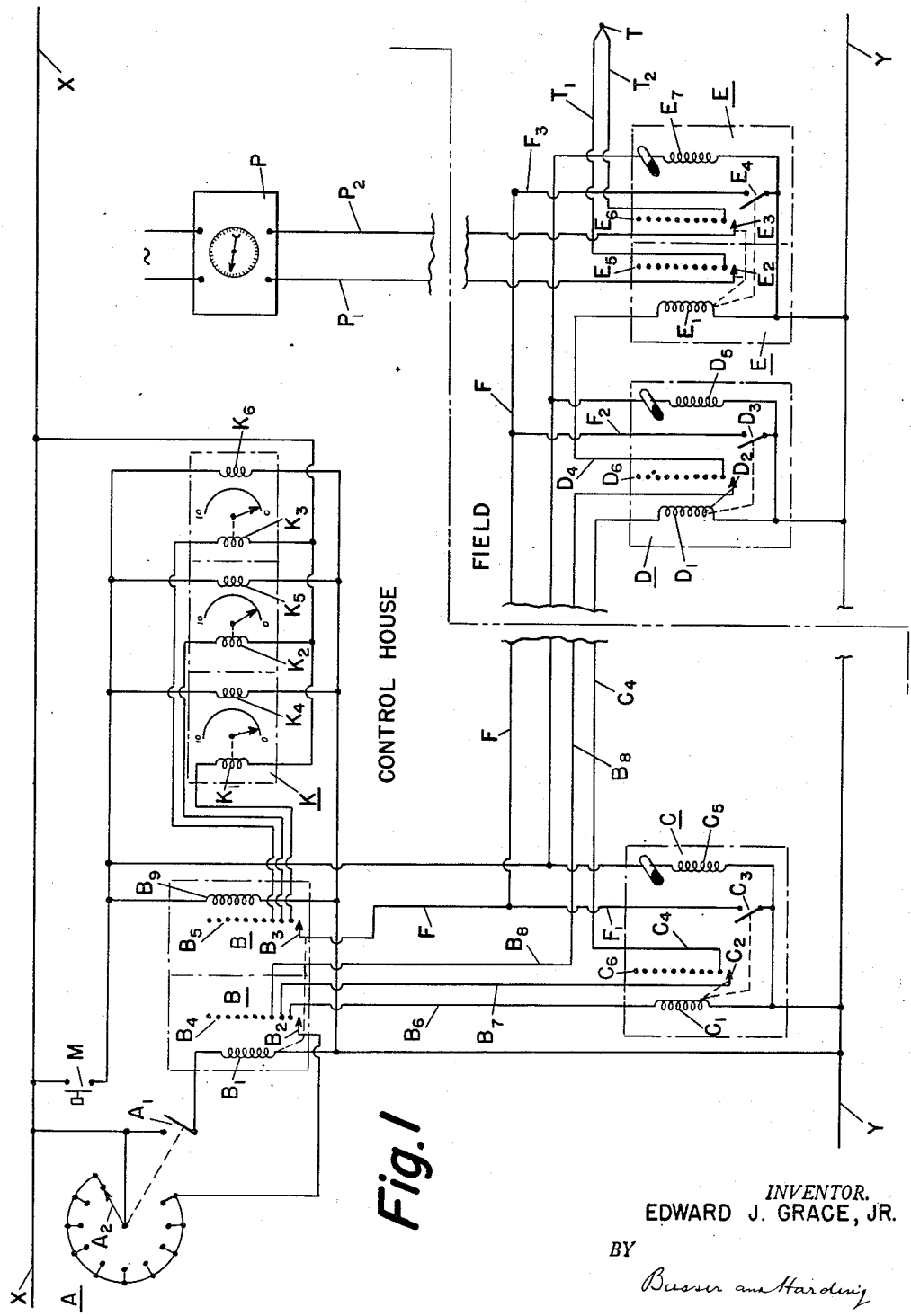

June 29, 1954  E. J. GRACE, JR  2,682,652
MEASURING AND CONTROL SYSTEM
Filed July 11, 1951  2 Sheets-Sheet 2

INVENTOR.
EDWARD J. GRACE, JR.
BY
ATTORNEYS

Patented June 29, 1954

2,682,652

UNITED STATES PATENT OFFICE 2,682,652

MEASURING AND CONTROL SYSTEM

Edward J. Grace, Jr., Swarthmore, Pa., assignor to Sun Oil Company, Philadelphia, Pa., a corporation of New Jersey Application July 11, 1951, Serial No. 236,189

1 Claim. (Cl. 340—150)

This invention relates to a system for selecting any one of a plurality of measurable variables which are located in a plant and connecting electrically the variable measuring apparatus to indicating devices located in a control room. The invention has particular utility in petroleum refinery operations wherein a plurality of temperature responsive devices, such as thermocouples, resistance thermometers or the like, are subjected to conditions existing in the various units of a refinery. The system is so designed that a thermocouple or other element can be selected and an indication made, in the control room, of the particular thermocouple or other element which has been selected and also the condition existing at the particular element selected, such as: the temperature existing at a selected thermocouple. In the further discussion the invention will be described in connection with the selection of thermocouples and the measurement of the temperature of the thermocouple selected.

The system of the present invention utilizes an ordinary telephone dial switch and a series of other switches each having ten contacts. In the system disclosed 1 "one-hundreds" stepping switch, 10 "tens" stepping switches and 100 "units" stepping switches are utilized and so arranged in a circuit that 1000 thermocouples may be selected as desired.

A dial actuated sequence switch is provided and has three contacts; the first is for selecting a contact on the "hundreds" stepping switch, the second is for selecting a contact on one of the "tens" stepping switches, and the third is for selecting a contact on one of the "units" stepping switches. The dial actuated sequence switch is in circuit between the dial switch and the stepping switches, and when the first number is dialed, the contact arm of the "hundreds" stepping switch will be advanced to a contact on this switch in accordance with the number which has been dialed; when the second number is dialed, current will pass through the contact selected on the "hundreds" stepping switch and be transmitted through a contact arm of one of the "tens" stepping switches to a selected contact thereon in accordance with the second number which has been dialed and, when the third number is dialed, the current will pass through the selected contact of the "tens" stepping switch and pass to a selected contact of one of the "units" stepping switches in accordance with the third number which has been dialed. A second and similar set of switches is provided in the "units" bank of switches and similar contacts on a switch of each bank will be simultaneously selected and the contact of each set of switches are in circuit with a thermocouple to provide for the selection of a thermocouple in accordance with the three numbers which have been dialed, which may range from 000–999. The contact arms of all the "unit" switches are in circuit with a potentiometer and when a thermocouple has been selected, its temperature is indicated. The dial actuated switch is provided with another set of three contacts and, as each number is dialed, current is transmitted to an indicator to show on the disks thereof the three numbers which have been dialed. In actual practice the sets of "tens" and "units" stepping switches will be located about the plant while the dial switch; "one-hundreds" stepping switch; and the dialed number indicator, as well as the potentiometer, will be located in the control room and the system operated from the control room.

As the numbers are dialed and the dial returns to rest position, a number of impulses will be sent through the operating coils or solenoids associated with the stepping switches and the contact arm of the switch selected in accordance with the first, second or third number dialed will be moved to the contact of the switch which has been selected. In addition the coils or solenoids are each mechanically connected to auxiliary switches and these in turn are in circuit with a single "feed-back" line which functions to send current back to the indicator to indicate each number as it is dialed as heretofore mentioned.

A push button switch is also provided to energize "release coils" in the system after a set of numbers has been dialed in order that a new number can be dialed. To accomplish this, connections are made to a plurality of resetting coils on each of the "hundreds," "tens" and "units" stepping switches and also on the indicator.

Figure 1 of the drawings is a wiring diagram showing the various elements required to select a thermocouple and to indicate both the thermocouple selected and its temperature.

Figure 2:
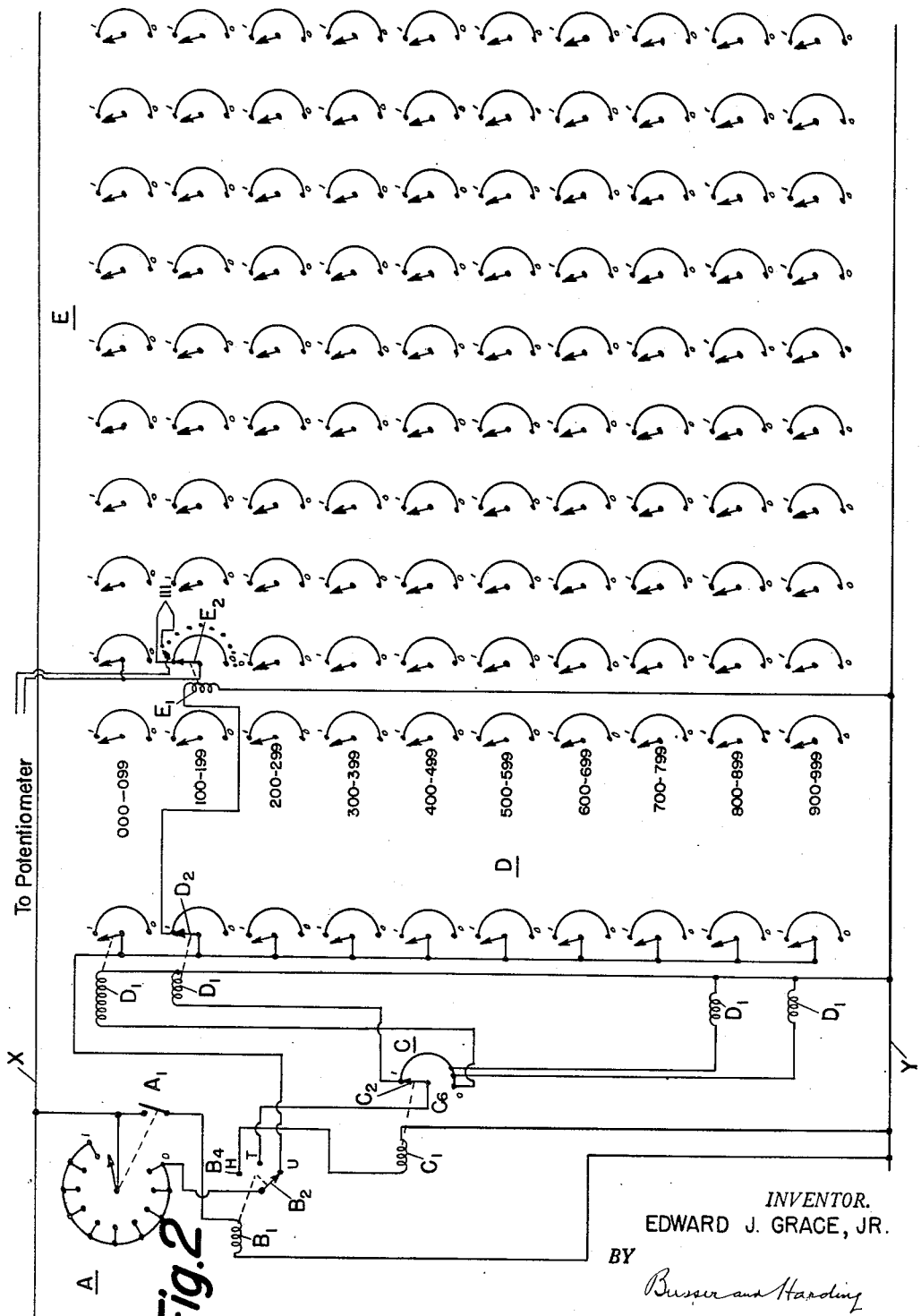

Figure 2 is a schematic view showing the arrangement of the various switches used in the system.

In Figure 1 the drawing is divided into two general sections indicated as "Control house" and "Field." The "Control house" may be considered as the instrument room of a petroleum refinery while the "Field" may be considered the operating section of the refinery. The principal parts of the system which have been referred to in the general discussion of the invention are indicated by capital letters and their associated operating elements are indicated by subnumerals.

In operation, when switch A is dialed the first time, the switch $A_1$ which is mechanically connected thereto becomes closed and the sequence switches B—B are placed in circuit between power lines X and Y and coil $B_1$ becomes energized. As the dial A returns to rest position the dial switch arm $A_2$ sends impulses through the coil $B_1$ and switch arm $B_2$ moves to the first contact of contact set $B_4$ which is in circuit with the "hundreds" stepping switch C through line $B_6$ and through coil $C_1$ the contact arm $C_2$ is advanced a number of steps or moves over a number of contacts of the contact set $C_6$ equal to the number which has been dialed. Assuming number 1 has been dialed the contact arm $C_2$ would advance to the first contact of set $C_6$. The relay coil $C_1$ of the "hundreds" selector switch is mechanically connected to an auxiliary switch $C_3$ and when the relay coil $C_1$ becomes energized the switch $C_3$ is closed sending current through auxiliary line $F_1$ to the main return line F back to the contact arm $B_3$. The contact arm $B_3$ is actuated simultaneously with arm $B_2$ and had been advanced to the first contact of set $B_5$ and upon closure of switch $C_3$ to an indicator K through the coil $K_1$ which actuates the "hundreds" disk of the indicator and indicates thereon the number which had been dialed or the number 1.

When the second number is dialed, the switch $A_1$ is again closed sending a single impulse to coil $B_1$ advancing the switch arms $B_2$ and $B_3$ to the second contact of banks $B_4$ and $B_5$. As the dial returns to rest position impulses are sent through the second contact point of bank $B_4$ through line $B_7$ to contact arm $C_2$ of the "hundreds" switch which had been advanced to and remained on the first contact of set $C_6$ and through line $C_4$ current is supplied to the "tens" stepping switch D. Its coil $D_1$ receives the impulses in accordance with the number dialed and the switch arm $D_2$ is advanced over set $D_6$ to its contact number 1 assuming the second number dialed is one and the switch arm $D_2$ would then rest on the number 1 contact of set $D_6$. Coil $D_1$ is mechanically connected with auxiliary switch $D_3$ and upon energization of coil $D_1$ the switch $D_3$ becomes closed sending current by auxiliary line $F_2$ to the main return line F then to the contact arm $B_3$ which has been advanced to the second contact of bank $B_5$ and to the coil $K_2$ to indicate on the "tens" disk the second number which had been dialed or number 1. When the third number is dialed, assuming it also to be number 1, switch $A_1$ is again closed and contact arms $B_2$ and $B_3$ are advanced by coil $B_1$ to the third contacts of contact sets $B_4$ and $B_5$. Impulses on the return of contact arm $A_2$ then pass through line $B_8$ to the "tens" selector switch D through its contact arm $D_2$ and from the first contact through line $D_4$ to the "units" stepping switches E—E energizing coil $E_1$ and advancing the contact arms $E_2$ and $E_3$ to the number one contact of the sets $E_5$—$E_6$. The coil $E_1$ is mechanically connected to switch $E_4$ and as the coil $E_1$ becomes energized the switch $E_4$ is closed sending current through auxiliary line $F_3$ to the main return line F and to contact arm $B_3$ which has been advanced to the third contact point in set $B_5$ sending current therethrough to the "units" disk of indicator K through coil $K_3$ and indicate the third number thereon or number 1. The contact arms $E_2$ and $E_3$ are advanced the number of contacts equal to the third number dialed and these arms are in circuit with a potentiometer P, through lines $P_1$ and $P_2$, which is calibrated to give direct readings of temperature. The first contacts in sets $E_5$ and $E_6$ are connected to thermocouple T, through lines $T_1$ and $T_2$ in accordance with the three numbers which have been dialed this thermocouple is number 111 and this number will be indicated on the indicator K and its temperature indicated by potentiometer P.

Reset coils $B_9$—$C_5$—$D_5$—$E_7$—$K_4$—$K_5$ and $K_6$ are all associated with their respective stepping switches and connected in a parallel circuit with the control switch M. Current is supplied to the system through main line X and the circuits of the various switches completed to main line Y. The control switch M is of the push button type and its manual closing simultaneously energizes all the reset coils to return all stepping switches simultaneously to a neutral position.

Figure 2 is a schematic view showing the arrangement of various switches utilized in the system and in the description thereof will be explained the circuit for the selection of thermocouple number 111.

When the first number is dialed, assuming it to be number 1, the contact arm $B_2$ will move to the "hundreds" or H contact of the contact set $B_4$. The coil $C_1$ of the "hundreds" stepping switch becomes energized and the contact arm $C_2$ of this switch moves into contact with the number 1 contact of set $C_6$ of switch C since one impulse had been made as the dial returned to rest position. There is only a single "hundreds" stepping switch C and this is made up of ten contacts, 1—2—3—4—5—6—7—8—9—0. The contact arm $C_2$ remains on the number 1 contact of the set $C_6$ and, assuming the second number dialed is also number 1, the contact arm $B_2$ is moved to the T or "tens" contact of the contact set $B_4$ and when the dial returns to its rest position, current is transmitted through the number 1 contact of the "hundreds" stepping switch and to one of the coils $D_1$ of a "tens" stepping switch D and as indicated the contact arm $D_2$ of the selected "tens" switch will be on the number 1 contact thereof placing the "hundreds" switch and one of the "tens" switches in circuit in preparation for the selection of thermocouple number 111.

The "tens" group is made up of a group of ten stepping switches D, each being similar to the "hundreds" stepping switch, and made up of ten contacts from 1-0. The "tens" switches are arranged to select coils for operating the "units" stepping switches each of which has its contacts in circuit with a thermocouple.

When the third number is dialed, the contact arm $B_2$ is advanced to the "units" contact U of contact set $B_4$ and current is transmitted directly through switch arm $D_2$ and the contact number 1 of the "tens" stepping switch which had been selected after the second number had been dialed to a coil $E_1$ of one of the "units" stepping switches. The coil $E_1$ will become energized and contact arm $E_2$ will move to the first contact of the switch which has its contacts in circuit with thermocouples 110–119. It is to be understood that there are two sets of contacts 1–10 for each of the "units" switches E and a contact of each set is in circuit with a thermocouple and after the thermocouple has been selected the temperature thereof will be indicated on potentiometer P which is in circuit with arms $E_2$ and $E_3$. As previously described each number is indicated as it is dialed and after three numbers are dialed and a thermocouple selected, both its number and its temperature will be indicated.

As mentioned heretofore, the system is set up in such a way that 1000 thermocouples can be dialed. It will be understood that no thermocouple is selected until one of the E or "units" sets of the stepping switches is energized. The "hundreds" stepping switch is indicated at C; the "tens" stepping switches are indicated at D; and the "units" stepping switches are indicated at E. The top row of "units" switches E would be used in selecting a thermocouple numbered from 000–099. The second row would be used to select thermocouples from 100–199, and the switch at the left of the second row will select thermocouples 100–109, while the next switch will select thermocouples 110–119, this switch is shown as selecting thermocouple number 111. The bottom row of "units" switches E would select thermocouples 900–999, and as shown on the drawing, the other rows would be used to select thermocouples indicated by the numbers at the left of the set of "units" switches.

I claim:

In a system for checking conditions existing at a plurality of measuring instruments which are located at different points about an industrial plant and which conditions can be translated into electrical energy, the improvement which comprises: a manual impulse sender; an instruments' number indicator and an instruments' condition indicator located in a control room; a sequence switch, having two banks of contacts and a contact arm for each of said banks in circuit with the impulse sender, said contact arms being simultaneously actuated when the impulse sender is operated, said instruments' numbering indicator comprising a plurality of stepping digit indicators wherein one stepping digit indicator is connected to each contact of one bank of contacts of said sequence switch, a plurality of stepping switches in circuit with the measuring instruments, one of said contact arms of the sequence switch being placed in circuit with a stepping switch when the impulse sender is operated, connections between each measuring instrument and the instruments' condition indicator, connections between the other bank of contacts of the sequence switch and the stepping indicators of the instruments' number indicator and means including a single return line and a switch for each stepping switch for independently placing each of the stepping switches in circuit through the other contact arm of the sequence switch with the instruments' number indicator when the manual switch is operated.

References Cited in the file of this patent

UNITED STATES PATENTS

| Number | Name | Date |
|---|---|---|
| 1,721,607 | Stewart et al. | July 23, 1929 |
| 2,564,294 | Belcher | Aug. 14, 1951 |